(No Model.)
J. WHITE.
AXLE BOX.
No. 308,223. Patented Nov. 18, 1884.
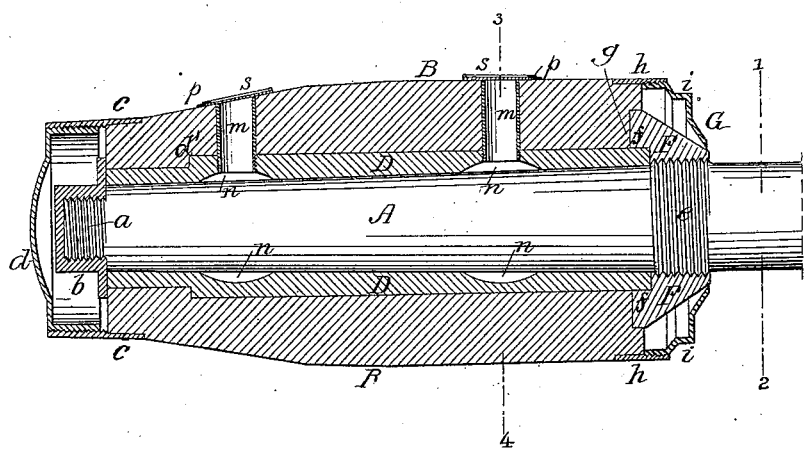
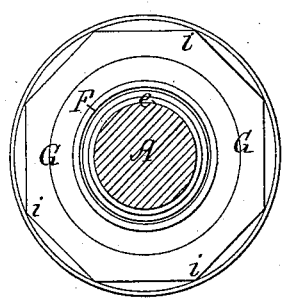
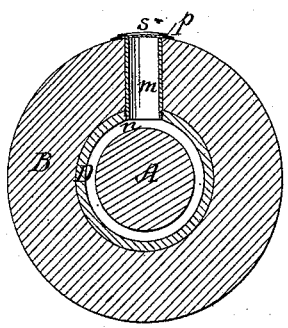
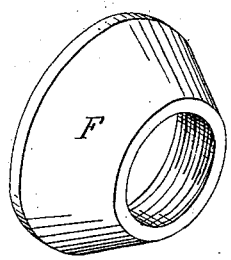
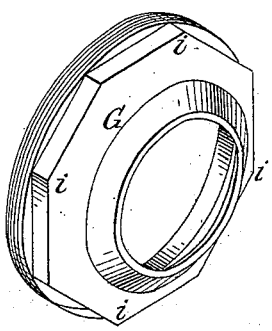
WITNESSES:
James T. Tobin
David Williams
INVENTOR:
Josiah White
by his Attorneys
Howson and Son

UNITED STATES PATENT OFFICE.

JOSIAH WHITE, OF DENTON, MARYLAND.

AXLE-BOX.

SPECIFICATION forming part of Letters Patent No. 308,223, dated November 18, 1884.

Application filed April 7, 1883. (No model.)

*To all whom it may concern:*

Be it known that I, JOSIAH WHITE, a citizen of the United States, residing in Denton, Caroline county, Maryland, have invented certain Improvements in Axle-Boxes for Vehicles, of which the following is a specification.

My invention relates to axle-boxes for vehicles the axles of which have tapered journals; and the object of my invention is to so construct such an axle-box as to insure the effective oiling of the axle without removing the wheel and to prevent the escape of the oil or the access of dust to the wearing-surfaces of the axle and box, and this object I attain, as more fully described hereinafter.

In the accompanying drawings, Figure 1 is a longitudinal section of an axle-box constructed in accordance with my invention. Fig. 2 is a transverse section on the line 1 2, Fig. 1. Fig. 3 is a transverse section on the line 3 4; and Figs. 4, 5, and 6, detached perspective views of parts of my improved axle box.

A is the journal of the axle; B, the hub of the wheel, and D a sleeve attached to the hub and adapted to turn upon the journal. The journal and the inner bearing-surface of the sleeve have corresponding tapers, as usual; but the outside of the sleeve is made cylindrical and its outer end is reduced in diameter, so as to form a shoulder, $d'$. This enables me to use two straight augers, instead of a conical auger, in boring the hub, and also insures a more even bearing between the hub and sleeve. At the end of the journal A is cut a screw-thread, to which is fitted a nut, $b$, the latter serving to hold the wheel in place on the axle. Over this nut is a cap, $d$, which screws into a flange, $c$, on the rim of the hub B, and thus prevents the entrance of dust at the outer end of the axle-box. At the opposite or rear end of the journal A is a screw-thread, $e$, to which is adapted a collar, F. This collar is recessed at $f$ to receive the rear end of the sleeve D, and is adapted to a groove, $g$, in the rear end of the hub B. The exterior of the collar F is preferably made conical, and over this collar is fitted a sheet-metal cap, G, which screws into a flange, $h$, on the hub B. The cap G is formed in the present instance with an eight-sided or angular portion, $i$, for the reception of a wrench. This cap prevents the access of dust to the bearing at the inner end of the box. In the sleeve D are cut annular grooves $n$ $n$, which form oil-chambers. With these chambers are connected supply-tubes $m$ $m$, passing through the hub B, the tubes being screwed into the sleeve D and forming a lock to prevent the hub from turning independently of or releasing itself from the sleeve. The outer ends of the tubes are tightly closed by sliding covers $s$, adapted to slide between flanged plates $p$ on the hub. By recessing the collar F at $f$, for the reception of the inner end of the sleeve D, a tight joint is formed and the escape of oil at this point is effectually prevented. This is important, because when the journal is tapered, as shown, the oil has a tendency to seek the portion of greatest diameter; hence, in the absence of a tight joint at the inner end of the journal, the oil would escape at this point, and the journal would not be properly lubricated. For the same reason, it is necessary to apply the oil at a point near the outer or smallest end of the journal, otherwise this portion of said journal would not be lubricated, as the oil applied at the inner portion of the journal would have no tendency to seek the outer end.

While not claiming, broadly, therefore, a self-oiling journal or a journal-box having an oil and dust-proof joint at the inner end, I claim as my invention—

The combination of an axle having a tapering journal, A, the axle-box D, adapted thereto and having an oil-supply chamber or passage communicating with the journal near the outer end thereof, and a collar, F, secured to the axle, and having a recess to which is snugly fitted the inner end of the box D, all substantially as set forth.

In testimony whereof I have signed my name to this specification in the presence of two subscribing witnesses.

JOSIAH WHITE.

Witnesses:
   ROBT. J. JUMP,
   J. W. KERR.